(12) United States Patent
Maltsev et al.

(10) Patent No.: US 7,885,178 B2
(45) Date of Patent: Feb. 8, 2011

(54) QUASI-PARALLEL MULTICHANNEL RECEIVERS FOR WIDEBAND ORTHOGONAL FREQUENCY DIVISION MULTIPLEXED COMMUNICATIONS AND ASSOCIATED METHODS

(75) Inventors: Alexander A. Maltsev, Nizhny Novgorod (RU); Ali S. Sadri, San Diego, CA (US); Sergey E. Sergeyev, Nizhny Novgorod (RU); Alexander N. Belonozhkin, Nizhny Novgorod (RU); Vadim S. Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1782 days.

(21) Appl. No.: 10/749,902

(22) Filed: Dec. 29, 2003

(65) Prior Publication Data

US 2005/0141406 A1    Jun. 30, 2005

(51) Int. Cl.
*H04J 11/00* (2006.01)

(52) U.S. Cl. .................... 370/208; 375/260; 375/316

(58) Field of Classification Search ........... 370/203, 370/208, 210; 375/260, 316–352
See application file for complete search history.

(56) References Cited

U.S. PATENT DOCUMENTS

| 4,613,975 | A | 9/1986 | Aoyagi et al. | |
|---|---|---|---|---|
| 5,106,192 | A | 4/1992 | Tucker et al. | |
| 6,173,164 | B1 * | 1/2001 | Shah | 375/344 |
| 7,293,101 | B1 * | 11/2007 | Schaefer et al. | 709/232 |
| 2002/0027950 | A1 | 3/2002 | Matthews | |
| 2003/0063680 | A1 * | 4/2003 | Nedic et al. | 375/350 |
| 2003/0123383 | A1 * | 7/2003 | Korobkov et al. | 370/208 |
| 2005/0144650 | A1 * | 6/2005 | Tu et al. | 725/131 |

FOREIGN PATENT DOCUMENTS

WO    WO-2005/067246 A2    7/2005

OTHER PUBLICATIONS

Communication Pursuant to Article 96(2) EPC mailed Jan. 25, 2007 in corresponding EP Application No. 04815157.5, 3 pgs.
International Preliminary Report on Patentability and Written Opinion mailed Jul. 3, 2006 in corresponding PCT Application No. PCT/US2004/043042, 9 pgs.

(Continued)

*Primary Examiner*—Ricky Ngo
*Assistant Examiner*—Pao Sinkantarakorn
(74) *Attorney, Agent, or Firm*—Schwegman, Lundberg & Woessner, P.A.; Gregory J. Gorrie

(57) ABSTRACT

A quasi-parallel receiver may simultaneously receive signals within several subchannels that comprise a wideband channel. The receiver includes a subchannel filter selection switch that provides a baseband signal to a selected one of a plurality of subchannel low-pass filters. A heterodyne frequency generator provides one of a plurality of heterodyne frequencies to convert an RF signal received within a selected subchannel to the baseband signal. The subchannel low-pass filters accumulate signal information from an associated one of a plurality of subchannels during a filter-input sampling interval. In some embodiments, individual analog-to-digital converters receive the accumulated signal outputs from an associated subchannel filter and generate digital signals for a subsequent Fourier transformation. In some embodiments, a normalized signal output may be provided to the analog-to-digital converters, allowing the use of lower resolution analog-to-digital converters. The analog-to-digital converters may have sampling rates based on the subchannel bandwidth.

26 Claims, 8 Drawing Sheets

OTHER PUBLICATIONS

International Search Report mailed Aug. 12, 2005 in corresponding PCT Application No. PCT/US2004/043042, 5 pgs.

"Partial International Search Report for corresponding PCT Application No. PCT/US2004/043042", (Jun. 7, 2005), 4 pgs.

* cited by examiner

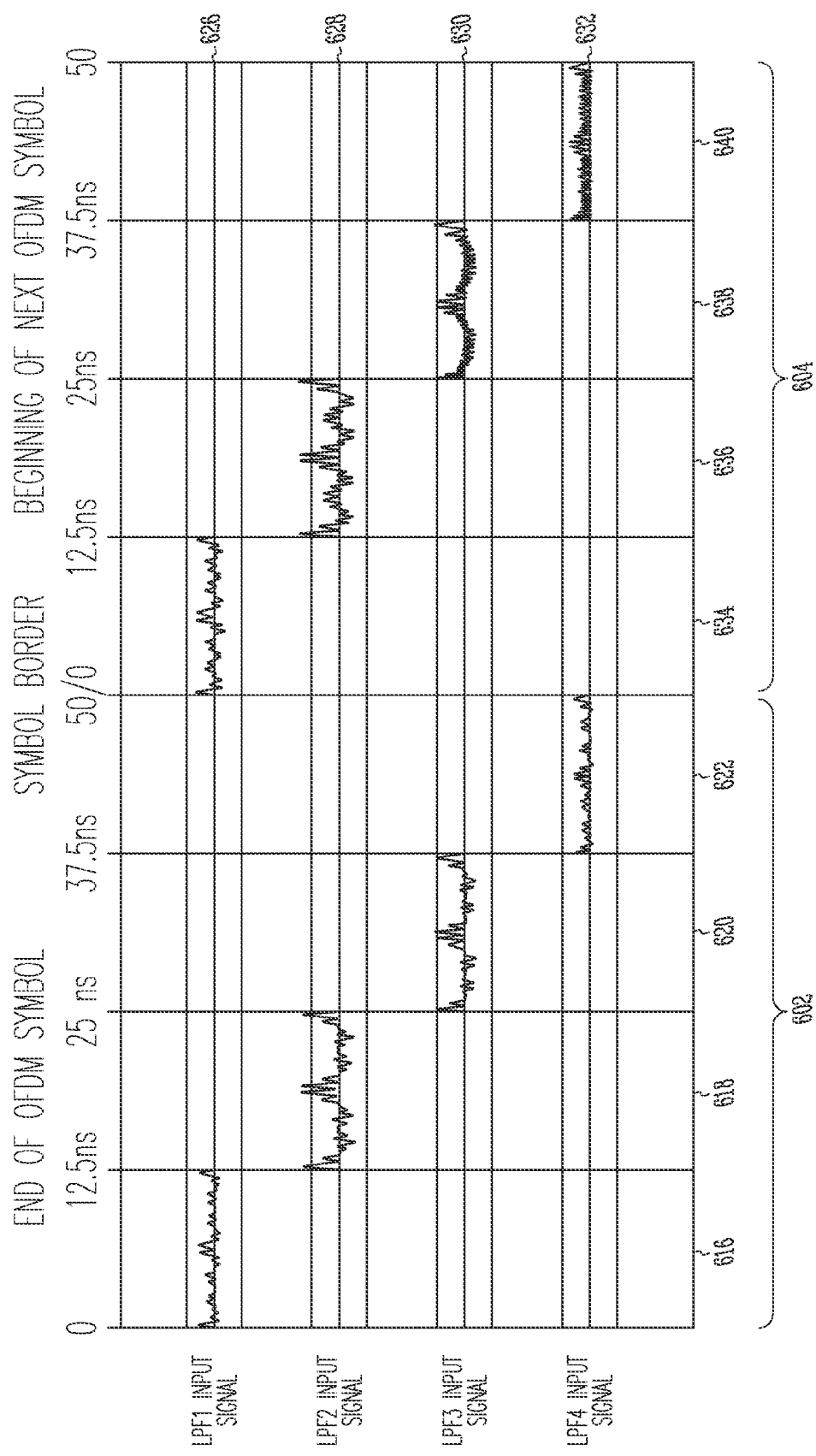

QUASI-PARALLEL MULTICHANNEL RECEIVERS FOR WIDEBAND ORTHOGONAL FREQUENCY DIVISION MULTIPLEXED COMMUNICATIONS AND ASSOCIATED METHODS

TECHNICAL FIELD

Embodiments of the present invention pertain to wireless electronic communications, and in some embodiments, the present invention pertains to orthogonal frequency division multiplexed communications.

BACKGROUND

Orthogonal frequency-division multiplexing (OFDM) is an example of a multi-carrier transmission technique that uses symbol-modulated orthogonal subcarriers to transmit information within an available spectrum. Many modern digital communication systems, including wireless local-area networks (WLANs), are using symbol-modulated orthogonal subcarriers as a modulation scheme to help signals survive in environments having multipath reflections and/or strong interference. One problem with many conventional systems that use symbol-modulated subcarriers is that channel bandwidth is limited to the bandwidth of the individual channels. Some conventional wireless communication systems, such as WLANs that implement OFDM communications, communicate using channels that may only have about a 20-MHz bandwidth. Thus, there are general needs for systems and methods for receiving wider bandwidth communications.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

FIGS. 6A, 6B and 6C illustrate timing diagrams in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
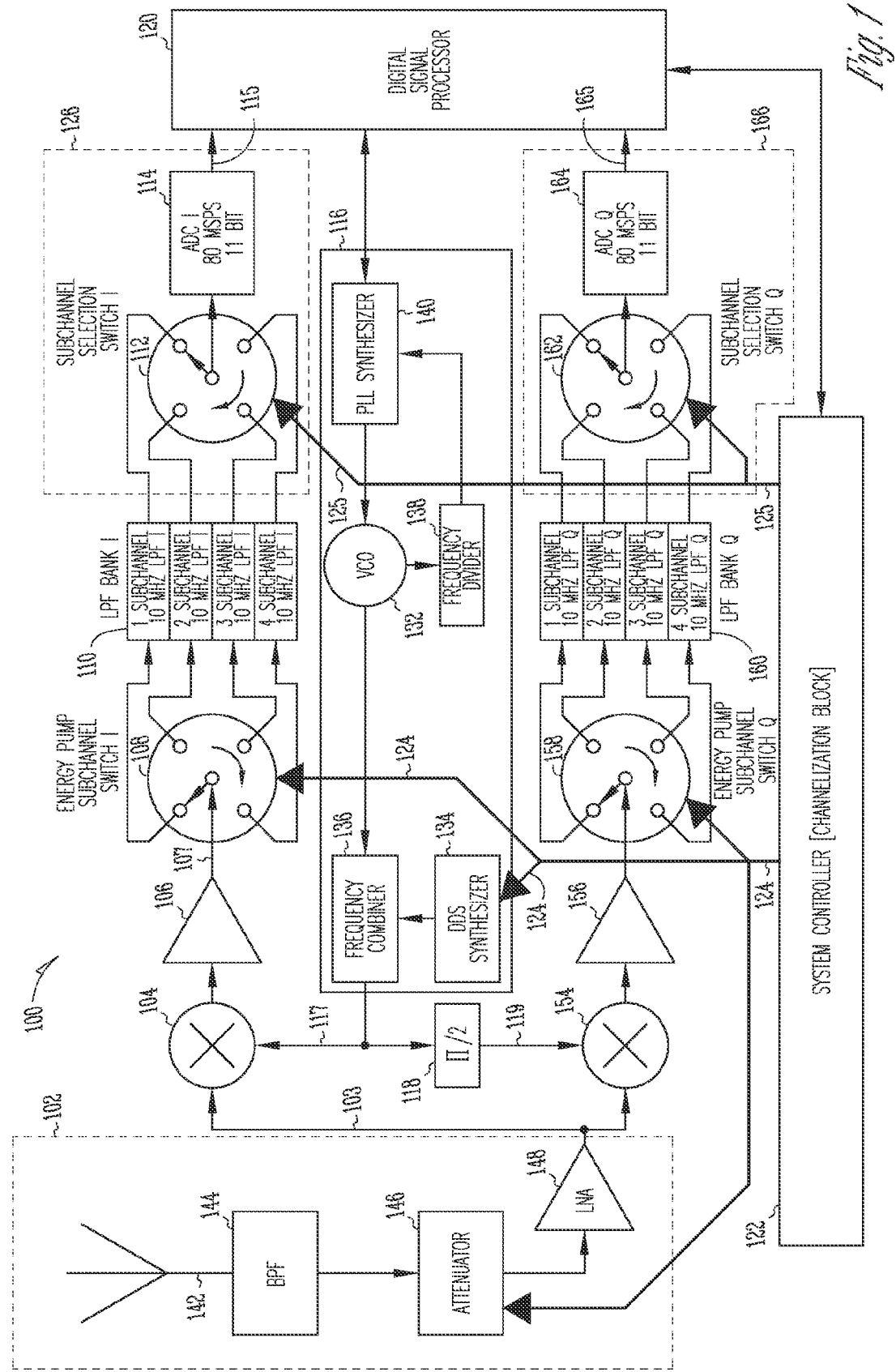
FIG. 1 is a block diagram of a receiver in accordance with some embodiments of the present invention.

FIG. 1 is a block diagram of a receiver in accordance with some embodiments of the present invention. Receiver 100 may be part of a wireless communication device and may receive orthogonal frequency division multiplexed (OFDM) communication signals. In some embodiments, receiver 100 may receive an OFDM symbol on a wideband communication channel. The wideband channel may comprise one or more subchannels. The subchannels may be frequency-division multiplexed (i.e., separated in frequency) and may be within a predetermined frequency spectrum. The subchannels may comprise a plurality of orthogonal subcarriers. In some embodiments, the orthogonal subcarriers of a subchannel may be closely spaced OFDM subcarriers. To achieve orthogonality between the closely spaced subcarriers, the subcarriers of a particular subchannel may have a null at substantially a center frequency of the other subcarriers of that subchannel.

In accordance with some embodiments, the subcarriers may have been symbol-modulated in accordance with individual subcarrier modulation assignments. This may be referred to as adaptive bit loading (ABL). Accordingly, one or more bits may be represented by a symbol modulated on a subcarrier. The modulation assignments for an individual subchannel may be based on the channel characteristics or channel conditions for that subcarrier, although the scope of the invention is not limited in this respect. In some embodiments, the subcarrier modulation assignments may range from zero bits per symbol to up to ten or more bits per symbol. In terms of modulation levels, the subcarrier modulation assignments may comprise, for example, binary phase shift keying (BPSK), which communicates one bit per symbol, quadrature phase shift keying (QPSK), which communicates two bits per symbol, 8 PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation assignments with higher communication rates per subcarrier may also be received.

An OFDM symbol may be viewed as the combination of the symbols modulated on the individual subcarriers. Because of the variable number of bits per symbol modulated on a subcarrier and the variable number of subchannels that may comprise a wideband channel, the number of bits per OFDM symbol may vary greatly.

In accordance with some embodiments, receiver 100 receives radio frequency (RF) signals through RF and front-end circuitry 102. Circuitry 102 may filter the RF signals received through antenna 142 with band-pass filter (BPF) 144. Circuitry 102 may also amplify the RF signals with low-noise amplifier (LNA) 148. RF signals 103 provided by circuitry 102 may be downconverted to baseband (e.g., zero-frequency) by in-phase (I) mixer 104 based on heterodyne frequency 117 generated by heterodyne frequency generator 116. The baseband signals for the I-channel may be amplified by baseband amplifier 106.

Subchannel filter selection switch 108 may couple baseband signals 107 to a selected one of a plurality of subchannel low-pass filters 110. Subchannel low pass filters 110 may accumulate signal information from an associated one of the subchannels during a filter-input sampling interval. During the filter-input sampling interval, heterodyne frequency generator 116 provides one of a plurality of heterodyne frequencies to convert RF signal 103, which may be received within a selected subchannel, to baseband signal 107. This may allow the downconversion of the proper subchannel frequency to baseband. The accumulated signal information from each subchannel may be individually provided by subchannel filters 110 to analog-to-digital converter circuitry 126 for conversion to digital signals 115.

For the quadrature-phase (Q) channel component, RF signals 103 may be downconverted to baseband (e.g., zero-frequency) by mixer 154 based on heterodyne frequency 119 generated by heterodyne frequency generator 116. Heterodyne frequency 119 may be shifted in phase by substantially ninety degrees by phase shifter 118. The baseband signals may be amplified by baseband amplifier 156. Subchannel filter selection switch 158 may couple the baseband signals to a selected one of a plurality of subchannel low-pass filters 160. Subchannel low-pass filters 160 may accumulate signal information from an associated one of the subchannels during a filter-input sampling interval. The accumulated signal information from each subchannel may be individually provided by subchannel filters 160 to analog-to-digital converter circuitry 166 for conversion to digital signals 165.

Digital signal processor (DSP) 120 may, among other things, perform fast Fourier transforms (FFTs) for each subchannel on digital signals 115 and 165 (i.e., both the I and the Q channel components). In some embodiments, FFT circuitry of DSP 120 may generate a parallel group of time-domain samples for each symbol-modulated subcarrier that may comprise each of the subchannels. In some embodiments, DSP 120 may include a plurality of FFT processing elements.

In some embodiments, DSP 120 may include an FFT processing element for each subchannel. In these embodiments, an FFT for each subchannel may be performed for an OFDM symbol received over a subchannel.

In other embodiments in which receiver 100 operates as a genuine multichannel receiver, FFTs may be performed for OFDM symbols received over more than one subchannel. In these embodiments, the FFTs do not need to start their processing simultaneously.

In some embodiments, system controller 122 may generate subchannel selection signal 124 for use by subchannel filter selection switches 108 and 158 and for use by heterodyne frequency generator 116. In these embodiments, the selected subchannel low-pass filter may be associated with a selected subchannel. Heterodyne frequency generator 116 may be responsive to subchannel selection signal 124 to generate one of a plurality of heterodyne frequencies to downconvert RF signals 103 within a corresponding one of the subchannels during a filter-input sampling interval. Subchannel filter selection switch 108 may also be responsive to subchannel selection signal 124 to switch among subchannel low-pass filters 110, allowing each subchannel filter to accumulate signal information received from an associated subchannel during the filter-input sampling interval. In some embodiments, the subchannel low-pass filters may work in parallel separately accumulating signal information from each subchannel. In some embodiments, subchannel filter selection switches 108 and 158 may provide signal energy to the selected subchannel low-pass filter during a filter-input sampling interval, allowing the selected subchannel filter to accumulate signal information and update its state.

In some embodiments, the filter-input sampling interval may be occur for each subchannel at least as often as the inverse of a bandwidth of the subchannel, although the scope of the present invention is not limited in this respect. The filter-input sampling interval may be selected to help assure that signal information from the subchannels is not lost during the sampling of the other subchannels. In some embodiments that have approximately 20-MHz subchannels, a filter-input sampling interval may occur at least once every 50 ns allowing signal information to be accumulated for each subchannel once every 50 ns, although the scope of the present invention is not limited in this respect.

In some embodiments, receiver 100 may be a wideband channel receiver for receiving OFDM signals in a wideband channel comprising one or more of the frequency-separated subchannels. In these embodiments, each subchannel low-pass filter may be associated with one of the subchannels. In some embodiments, the subchannel low-pass filters may have a filter bandwidth of approximately half the subchannel bandwidth. For example, when the subchannels have a subchannel bandwidth of approximately 20-MHz, the subchannel low-pass filters have a 3 dB filter bandwidth of approximately 10-MHz, although the scope of the invention is not limited in this respect.

In some embodiments, each of subchannel low-pass filters 110 and each of subchannel low-pass filters 160 may be substantially identical. For example, in some embodiments, all subchannel low-pass filters may have the same cutoff frequency and discrimination order, and they may be of the same filter type. Examples of suitable filter types include elliptical filters, Tchebyshev filters, and Butterworth filters, although the scope of the invention is not limited in this respect.

In some embodiments, analog-to-digital converter circuitry 126 may comprise whole-channel analog-to-digital converter 114 and subchannel filter output selection switch 112 (i.e., for the in-phase channel components). In these embodiments, analog-to-digital converter circuitry 166 may comprise whole-channel analog-to-digital converter 164 and subchannel filter output selection switch 162 (i.e., for the quadrature-phase channel components). Subchannel filter output selection switch 112 may be responsive to subchannel filter output selection signal 125 and may provide an accumulated signal output from a selected one of subchannel low-pass filters 110 to whole-channel analog-to-digital converter 114. Subchannel filter output selection switch 162 may also be responsive to subchannel filter-output selection signal 125 and may provide an accumulated signal output from a selected one of subchannel low-pass filters 160 to whole-channel analog-to-digital converter 164. In some embodiments when the wideband channel comprises up to four or more subchannels, whole-channel analog-to-digital converters 114 and 164 may comprise at least 9-bit analog-to-digital converters having a sampling rate of at least as great as a bandwidth of the wideband channel. In the case of an up to 80-MHz wideband channel, whole-channel analog-to-digital converters 114 and 164 may have sampling rates of at least 80-MSPS, although the scope of the invention is not limited in this respect.

Whole-channel analog-to-digital converters 114 and 164 may generate a combination (i.e., not the sum) of signals sampled from the subchannels. For example, in the case of four subchannels, every fourth (time-domain) sample provided by whole-channel analog-to-digital converters 114 and 164 may be associated with the same subchannel. As an example, whole-channel analog-to-digital converters 114 and 164 may be suitable for providing samples from four 20-MHz subchannels, two 40-MHz subchannels, one 80-MHz wideband channel, although the scope of the invention is not limited in this respect.

Subchannel filter output selection signal 125 may cause switch 112 to switch between outputs of subchannel low-pass filters 110 and may cause switch 162 to switch between outputs of subchannel low-pass filters 160 allowing subchannel low pass filters 110 and 160 to be sampled at least once every filter-output sampling interval. The filter-output sampling interval is explained in more detail below.

Although whole-channel analog-to-digital converters 114 and 164 are illustrated as having an 11-bit resolution, this is not a requirement and whole-channel analog-to-digital converters 114 and 164 with lower or greater resolutions may also be suitable. Embodiments which receive a greater number of subchannels may utilize whole-channel analog-to-digital converters 114 and 164 with greater resolutions and/or sampling rates. In other embodiments, discussed in more detail below, a single-channel ADC may be used for each subchannel with lower sampling rates and/or lower resolutions, which may help reduce cost, among other things.

In some embodiments, receiver 100 may determine which subchannels of a wideband channel are being used to convey an OFDM symbol. In these embodiments, signal detectors may be utilized at the output of subchannel low-pass filters 110, 160 to detect which of the subchannels are simultaneously conveying information. Further signal processing, including analog-to-digital conversion, may be refrained from being performed on inactive subchannels.

In some embodiments, RF and front-end circuitry 102 may comprise attenuator 146 in the RF signal path responsive to subchannel selection signal 124 to attenuate the RF signal. The attenuation level may be selected on a per-subchannel basis to provide a normalized signal level for the analog-to-digital conversion in circuitry 126 and 166. The use of a normalized signal level across the subchannels may allow the use of lower resolution analog-to-digital converters.

In some embodiments, heterodyne frequency generator 116 comprises fixed-frequency voltage-controlled oscillator (VCO) 132 to generate a constant reference frequency, and a direct digital synthesizer (DDS) 134 to generate a selected one of a plurality of stepped frequencies in response to subchannel selection signal 124. Heterodyne frequency generator 116 may also comprise frequency combiner 136 to combine the reference frequency and the selected one of the stepped frequencies to generate heterodyne frequency 117 to downconvert RF signals within the selected subchannel to baseband signals. In some embodiments, heterodyne frequency generator 116 may further comprise phase-locked loop (PLL) synthesizer 140 and frequency divider 138 to operate with VCO 132 to generate heterodyne frequency 117. Other configurations for selectively generating heterodyne frequencies may also be suitable for use with embodiments of the present invention. In some embodiments in which subchannels are separated in frequency by approximately 20-MHz, the stepped frequencies generated by DDS 134 may be in 20-MHz steps, although the scope of the invention is not limited in this respect.

In some embodiments, the frequency spectrums for a wideband channel may comprise subchannels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, receiver 100 may be part of a personal digital assistant (PDA), a laptop or portable computer with wireless communication capability, a web tablet, a wireless telephone, a wireless headset, a pager, an instant messaging device, an MP3 player, a digital camera, an access point or other device that may receive and/or transmit information wirelessly. In some embodiments, receiver 100 may receive RF communications in accordance with specific communication standards, such as the EEEE 802.11 (a), 802.11 (b), 802.11 (g/h) and/or 802.16 standards for wireless local area networks, although receiver 100 may also be suitable to receive communications in accordance with other techniques including the Digital Video Broadcasting Terrestrial (DVB-T) broadcasting standard, and the High performance radio Local Area Network (HiperLAN) standard. Antenna 142 may comprise one or more directional or omnidirectional antennas, including, for example, dipole antennas, monopole antennas, loop antennas, microstrip antennas or other type of antenna or combination thereof suitable for reception of RF signals within a frequency spectrum to be received by receiver 100.

Although embodiments of the present invention are described as being suitable for reception and processing of OFDM signals, the scope of the present invention is not limited in this respect. Other embodiments may be suitable for receiving and processing signals having other types of modulation formats.

Although receiver 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Figure 2A:
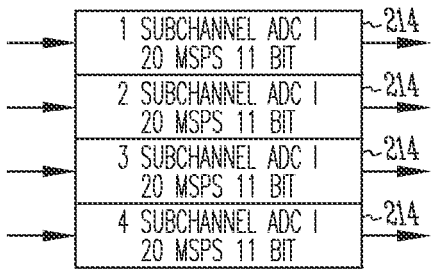
FIGS. 2A and 2B illustrate subchannel analog-to-digital converter circuitry in accordance with some embodiments of the present invention.
Figure 2B:
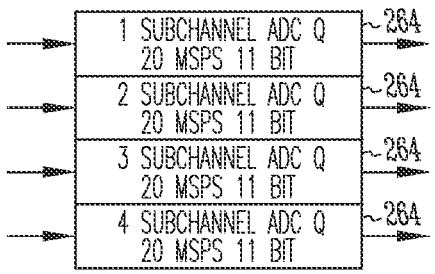

FIGS. 2A and 2B illustrate subchannel analog-to-digital converter circuitry in accordance with some embodiments of the present invention. In these embodiments, analog-to-digital converter circuitry 226 may be suitable for use as analog-to-digital converter circuitry 126 (FIG. 1), and analog-to-digital converters 266 may be suitable for use as analog-to-digital converter circuitry 166 (FIG. 1). In these embodiments, analog-to-digital converter circuitry 226 may comprise a plurality of individual subchannel analog-to-digital converters 214 for the I-phase channel components, and analog-to-digital converter circuitry 266 may comprise a plurality of individual subchannel analog-to-digital converters 264 for the Q-phase channel components. Each subchannel analog-to-digital converter 214 may receive an accumulated signal output from a corresponding one of subchannel low-pass filters 110 (FIG. 1), and each subchannel analog-to-digital converter 264 may receive an accumulated signal output from a corresponding one of subchannel low-pass filters 160 (FIG. 1).

In some embodiments, individual subchannel analog-to-digital converters 214 and 264 may comprise at least 9-bit analog-to-digital converters having sampling rates of at least as great as a bandwidth of a subchannel. In some embodiments in which the subchannels have bandwidths of approximately 20-MHz, the sampling rate may be at least 20 MSPS. Although individual subchannel analog-to-digital converters 214 and 264 are illustrated as 11-bit individual subchannel analog-to-digital converters, this is not a requirement and embodiments of the present invention may be implemented with individual subchannel analog-to-digital converters having lower or greater resolutions.

The resolutions of individual subchannel analog-to-digital converters 214 and 264 may be estimated from the modulation order and the number of subcarriers of a subchannel. In the case of 64-QAM modulation, for each of the subcarriers, at least three bits of resolution for each I and Q component may be required. When a subchannel includes forty-eight data subcarriers, six additional bits of resolution may be required (e.g., the ceiling of base 2 log of 48). Accordingly, in this example, approximately nine bits of resolution may be provided by each of individual subchannel analog-to-digital converters 214 and 264. Additional resolution may be added for improved noise handling, and a soft decision capability may also be added for decoding. In general, a conventional "single" channel receiver, which may process a wideband channel as a single channel, may require an additional 2-bit (four times) resolution to achieve similar accuracy. This may be significantly more expensive.

In some embodiments, an attenuation level provided by an attenuator, such as attenuator 146 (FIG. 1), may be selected on a per-subchannel basis to provide a normalized signal level for the selected subchannel filter and a corresponding one of the subchannel analog-to-digital converters 214 and 264. The normalized subchannel signal levels may allow the use of lower resolution analog-to-digital converters.

The use of individual subchannel analog-to-digital converters, instead of a single analog-to-digital converter, such as whole-channel analog-to-digital converters 114 (FIG. 1) and 164 (FIG. 1), may allow the use of analog-to-digital converters with lower sampling rates and/or lower resolutions. This may help significantly reduce manufacturing costs.

Figure 3:
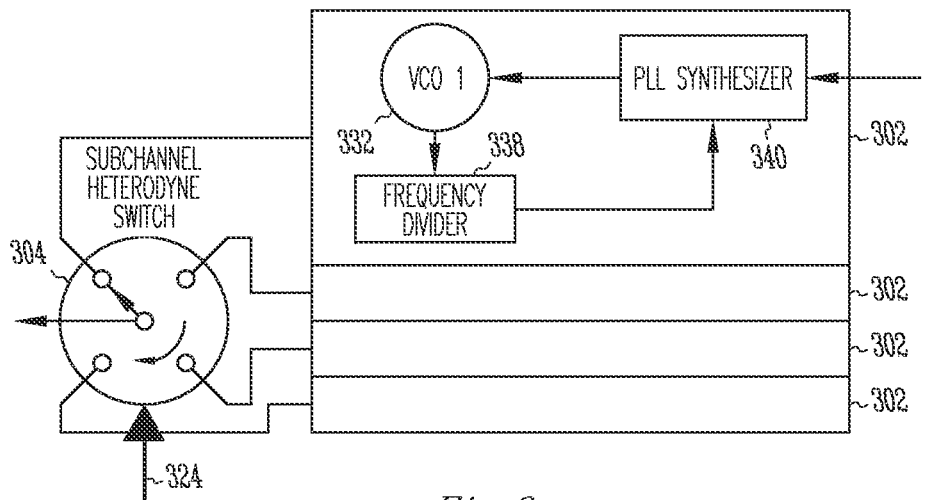
FIG. 3 illustrates a heterodyne frequency generator in accordance with some embodiments of the present invention.

FIG. 3 illustrates a heterodyne frequency generator in accordance with some embodiments of the present invention. Heterodyne frequency generator 316 may be suitable for use as heterodyne frequency generator 116 (FIG. 1), although other heterodyne frequency generators may also be suitable. Heterodyne frequency generator 316 comprises a plurality of individual heterodyne frequency generators 302, each of which may include fixed-frequency voltage-controlled oscillator (VCO) 332. Each fixed-frequency voltage-controlled oscillator 332 may generate a single heterodyne frequency for downconverting a particular subchannel. Heterodyne frequency generator 316 may also comprise subchannel heterodyne switch 304 to select a heterodyne frequency from one of individual heterodyne frequency generators 302 in response to subchannel selection signal 324. In some embodiments, subchannel selection signal 324 may correspond to subchannel selection signal 124 (FIG. 1).

In some embodiments, each of individual heterodyne frequency generators 302 may comprise phase-locked loop synthesizer 340 and frequency divider 338 to operate with voltage-controlled oscillator 332 to generate the heterodyne frequency. Other configurations for selectively generating heterodyne frequencies are also suitable for use with embodiments of the present invention.

Figure 4A:
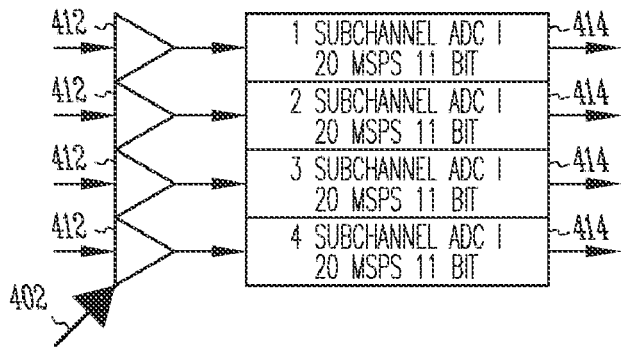
FIGS. 4A and 4B illustrate subchannel analog-to-digital converter circuitry with corresponding amplifiers in accordance with some embodiments of the present invention.
Figure 4B:
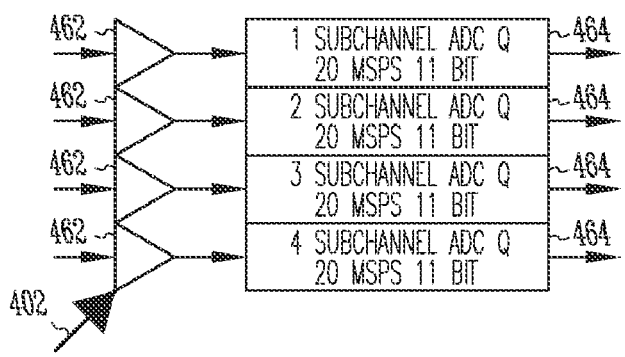

FIGS. 4A and 4B illustrate subchannel analog-to-digital converter circuitry with corresponding amplifiers in accordance with some embodiments of the present invention. In these embodiments, analog-to-digital converter circuitry 426 may be suitable for use as analog-to-digital converter circuitry 126 (FIG. 1), and analog-to-digital converter circuitry 466 may be suitable for use as analog-to-digital converter circuitry 166 (FIG. 1). In these embodiments, analog-to-digital converter circuitry 426 may comprise a plurality of individual subchannel analog-to-digital converters 414 and associated amplifiers 412 for the I-phase channel components, and analog-to-digital converter circuitry 466 may comprise a plurality of individual subchannel analog-to-digital converters 464 and associated amplifiers 462 for the Q-phase channel components. Each subchannel analog-to-digital converter 414 may receive an amplified accumulated signal output from a corresponding one of subchannel low-pass filters 110 (FIG. 1), and each subchannel analog-to-digital converter 464 may receive an amplified accumulated signal output from a corresponding one of subchannel low-pass filters 160 (FIG. 1).

In accordance with some embodiments, amplifiers 412 and 462 may amplify the accumulated signal outputs based on gain control signals 402 for each subchannel. In these embodiments, an attenuator in the RF signal path, such as attenuator 146 (FIG. 1), is not necessarily required because the gain of amplifiers 412 and 462 may be set to provide a normalized signal level to the analog-to-digital converters.

In some embodiments, the individual subchannel analog-to-digital converters 414 and 464 may comprise at least 9-bit analog-to-digital converters having sampling rates of at least as great as a bandwidth of a subchannel. In some embodiments in which the subchannels have bandwidths of approximately 20-MHz, the sampling rate of the analog-to-digital converters may be at least approximately 20 MSPS. The use of gain control signals 402 to normalize the output may allow the use of lower resolution analog-to-digital converters. Although individual subchannel analog-to-digital converters 414 and 464 are illustrated as having a resolution of 11-bits, this is not a requirement. Individual subchannel analog-to-digital converters 414 and 464 with greater and lesser resolutions may also be suitable.

Figure 5:
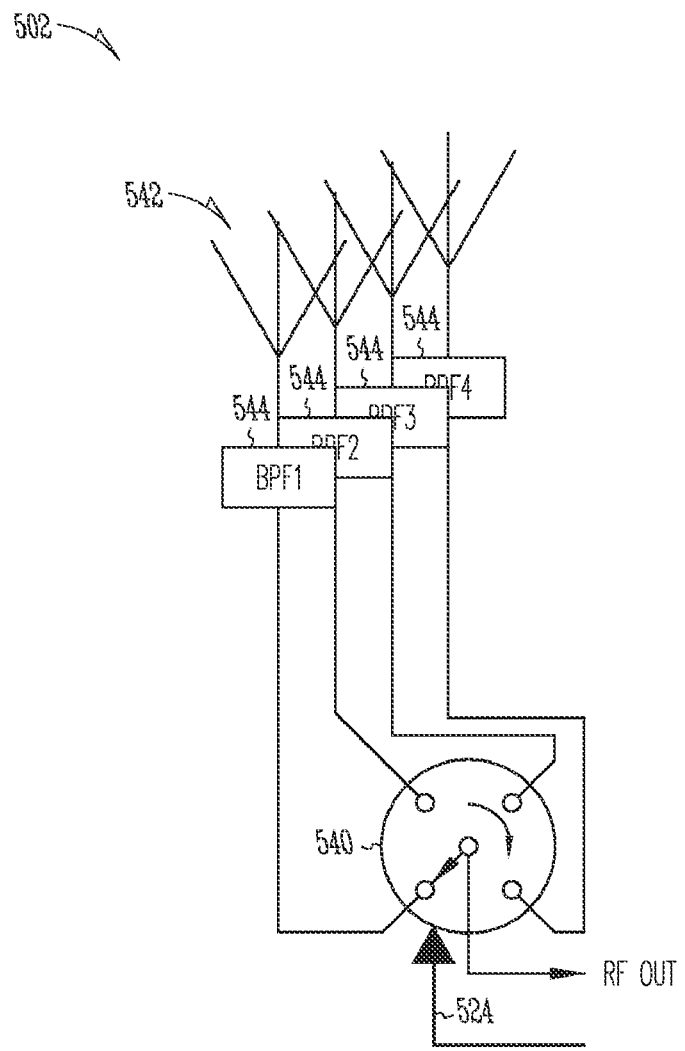
FIG. 5 illustrates radio-frequency (RF) and front-end circuitry in accordance with some embodiments of the present invention.

FIG. 5 illustrates RF and front-end circuitry in accordance with some embodiments of the present invention. RF and front-end circuitry 502 may be suitable for use as RF and front-end circuitry 102 (FIG. 1), although other circuitry may also be suitable. In these embodiments, a receiver, such as receiver 100 (FIG. 1), may utilize more than one of spatially-diverse antennas 542 to "divide" a single subchannel into one or more spatial channels. In some embodiments, each antenna 542 may receive signals from one spatial channel. In some embodiments, each spatial channel may be used to communicate separate or independent data streams on the same subcarriers as the other spatial channels, allowing the reception of additional data without an increase in frequency bandwidth. In other embodiments, each spatial channel may be used to communicate the same data as the other spatial channels. In these embodiments, the use of spatial channels may take advantage of the multipath characteristics of a particular subchannel. In some embodiments, the spatial channels may be non-orthogonal channels (e.g., may overlap in frequency and or time) and in some embodiments, each spatial channel may use the same subcarriers as the other spatial channels.

In some embodiments, an OFDM symbol may be received over a single subchannel comprising a plurality of spatial channels. Each spatial channel may comprise the same set of orthogonal subcarriers. In some embodiments, a single subchannel may have a bandwidth of approximately 20-MHz, although the scope of the invention is not limited in this respect.

In some embodiments, RF circuitry 502 may comprise antenna selection switch 540 to select one of antennas 542 in response to spatial channel selection signal 524. In these embodiments, which may be referred to as open-loop multiple-input, multiple-output (MIMO) embodiments, each of antennas 542 may correspond to one of the spatial channels. In some embodiments, circuitry 502 may filter the RF signals received through antennas 542 with an associated one of band-pass filters (BPFs) 544, although the scope of the invention is not limited in this respect. In some embodiments, each of subchannel low-pass filters 110 (FIG. 1) may be associated with one of the spatial channels, and each of subchannel low-pass filters 160 (FIG. 1) may also be associated with one of the spatial channels. In these embodiments, the individual subchannel low-pass filters may accumulate signal information from a particular spatial channel during a filter-input sampling interval. Spatial channel selection signal 524 may correspond to subchannel selection signal 124 (FIG. 1) and may cause antenna selection switch 540 to select an antenna for receiving each spatial channel during the filter-input sampling interval.

In some embodiments, which may be referred to as closed-loop MIMO embodiments, the spatial channels may be orthogonal spatial channels, and a one-to-one correspondence between antennas 542 and spatial channels is not required. In these embodiments, the orthogonal spatial channels may be generated with beamforming techniques at the transmitter, and received using beamforming techniques at the receiver. In these embodiments, DSP 120 (FIG. 1) may be configured to perform receiving beamforming to extract the information from the orthogonal spatial channels, which can be referred to as orthogonalization of spatial channels. The use of orthogonal spatial channels may help reduce crosstalk between spatial channels in comparison with open-loop embodiments.

In some embodiments, a heterodyne frequency generator may provide a single heterodyne frequency to convert RF signals of the single frequency subchannel to baseband signals. The spatial channel low-pass filters may accumulate signal information for a corresponding one of the spatial channels during the appropriate filter-input sampling interval.

Figure 6A:
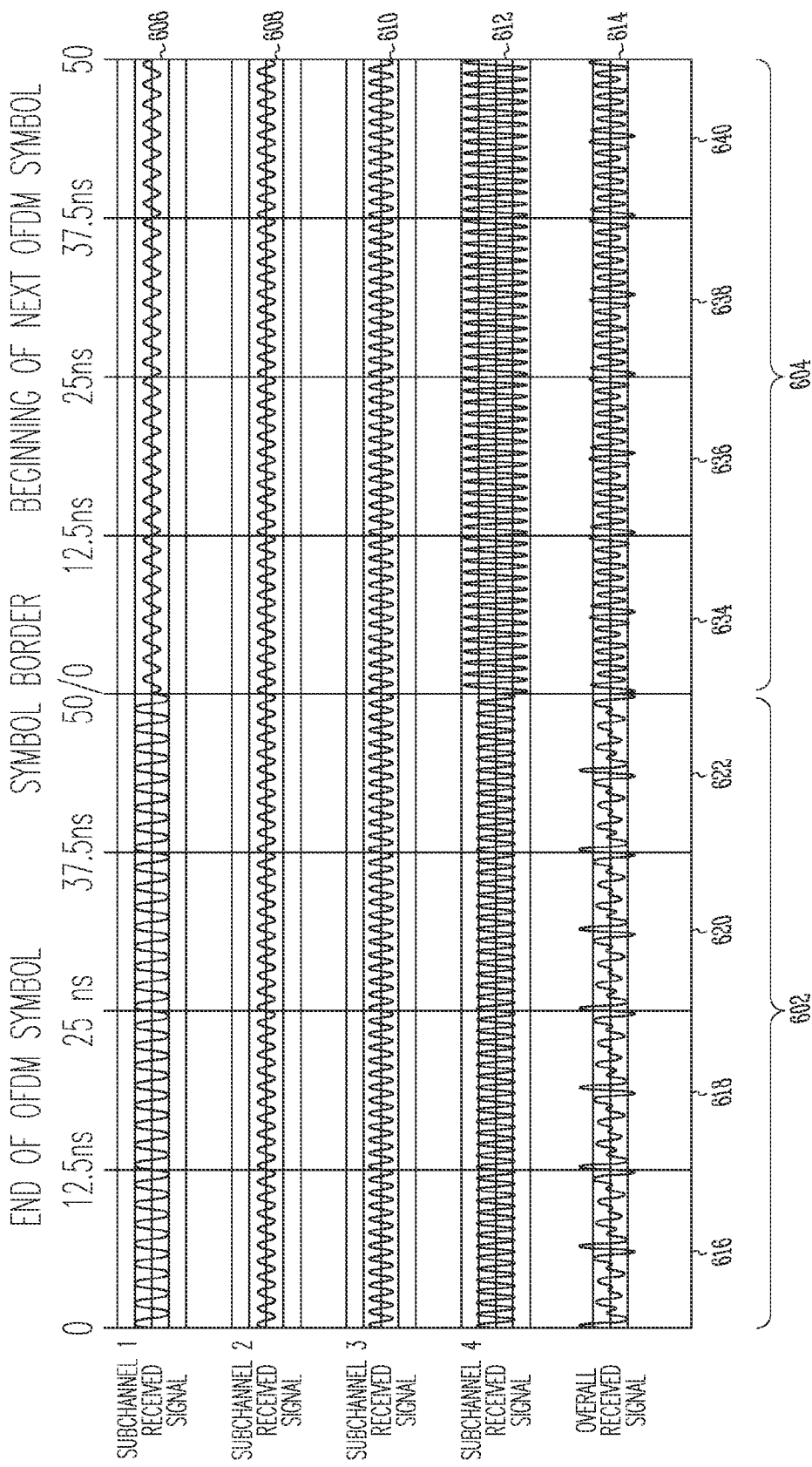
Figure 6B:
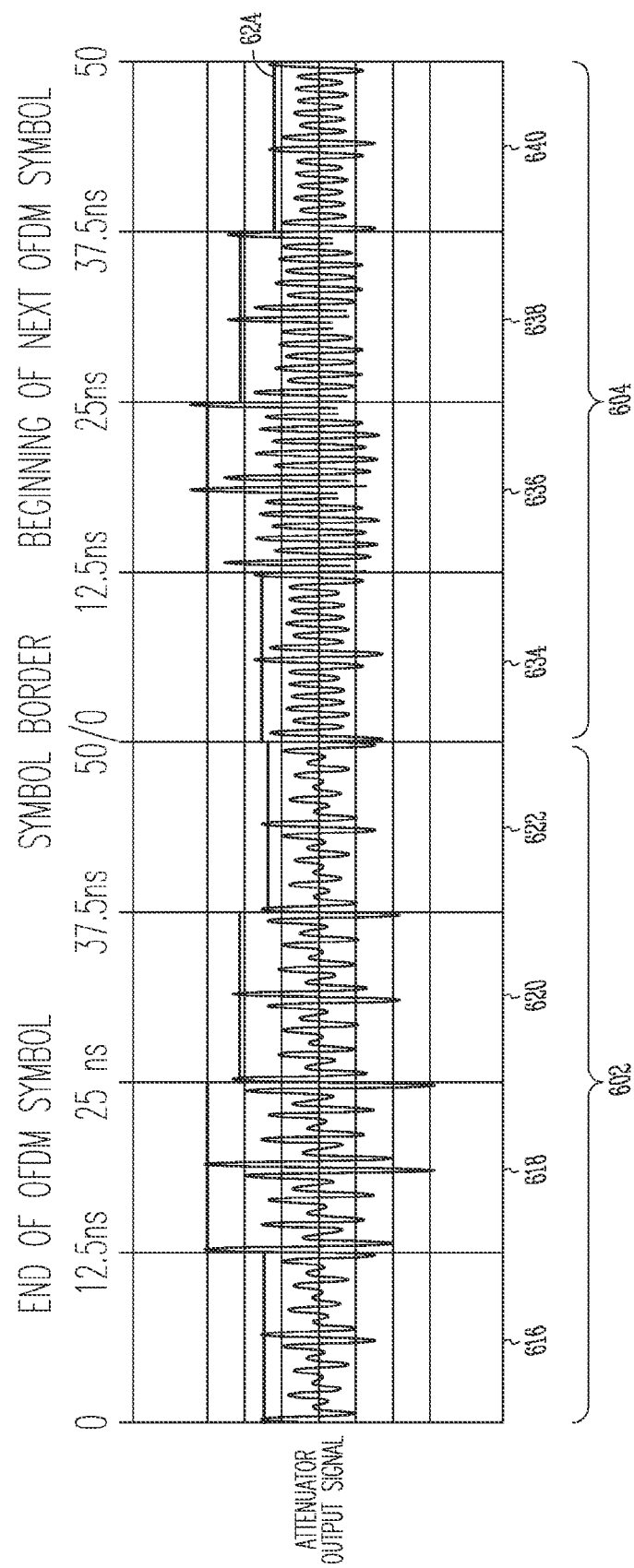

FIGS. 6A, 6B and 6C illustrate timing diagrams in accordance with some embodiments of the present invention. FIG. 6A qualitatively depicts two consecutive 50 ns sampling intervals. Each 50 ns time interval may be a filter-input sampling interval and may include a sampling subinterval for each subchannel. First filter-input sampling interval 602 may be at the end of a current OFDM symbol, and filter-input sampling interval 604 may be at the beginning of a next OFDM symbol. In this example, receiver 100 (FIG. 1) may receive four signals 606, 608, 610 and 612 from four subchannels simultaneously. Signal 614 illustrates the sum of signals 606, 608, 610 and 612, which may be viewed as the overall signal coming on a wideband channel (which is 80-MHz in this example).

Signal 606 during filter-input sampling subinterval 616 (i.e., from 0 ns to 12.5 ns) may be downconverted to baseband using a controlled heterodyne frequency. During sampling subinterval 616, both I and Q subchannel filter selection switches 108 and 158 may connect their outputs respectively to a first subchannel low-pass filter (for both the I and Q channel components, respectively) and the baseband signals from the first subchannel are filtered.

In next filter-input sampling subinterval 618 (i.e., from 12.5 ns to 25 ns), signal 608 may be downconverted to baseband using a controlled heterodyne, and both I and Q subchannel filter selection switches 108 and 158 may connect their outputs to a second subchannel low-pass filter (for both the I and Q channel components, respectively), and the baseband signals from the second subchannel are filtered.

In the next filter-input sampling subinterval 620 (i.e., from 25 ns to 37.5 ns), signal 610 may be downconverted to baseband using a controlled heterodyne, and both I and Q subchannel filter selection switches 108 and 158 may connect their outputs to a third subchannel low-pass filter (for both the I and Q channel components, respectively), and the baseband signals from the third subchannel are filtered.

In the next filter-input sampling subinterval 622 (i.e., from 37.5 ns to 50 ns), signal 612 may be downconverted to baseband using a controlled heterodyne, and both I and Q subchannel filter selection switches 108 and 158 may connect their outputs to a fourth subchannel low-pass filter (for both the I and Q channel components, respectively), and the baseband signals from the fourth subchannel are filtered.

This process may be performed for each subchannel and is not limited to the example of four subchannels. This process may also be repeated at least as often as the inverse of the bandwidth of a subchannel, although the scope of the invention is not limited in this respect.

Wideband signal processing with a synchronous switching of heterodyne frequency and subchannel low-pass filters may result in the subchannel low-pass filter output signal level to be just about the same as if it were obtained using a separate subchannel receiver for each subchannel normalized for the associated subchannel. In some cases when there are four subchannels, the subchannel low-pass filter output level may be about four-times less than the output level of a low-pass filter in an equivalent single subchannel receiver, because about one-fourth of the signal energy is accumulated by the subchannel low-pass filters. Little or no signal-to-noise ratio (SNR) degradation may occur, because the noise power may also be reduced by a factor of about four, keeping the SNR about the same as for a single subchannel receiver. In some embodiments of the present invention, power loss may be compensated by providing additional gain before subchannel low-pass filters 110 (FIG. 1) and 160 (FIG. 1). Circuitry 426 (FIG. 4A) and circuitry 466 (FIG. 4B) illustrate examples of this, although the scope of the invention is not limited in this respect.

Although filter-input sampling intervals 602 and 604 are 50 ns intervals illustrated as having four sampling subintervals of 12.5 ns, this is not a requirement as it illustrates embodiments having four 20-MHz bandwidth subchannels comprising a wideband channel of having an 80-MHz bandwidth. Accordingly, the scope of the present invention is not limited in this respect. In some embodiments, the length of intervals 602 and 604 depend on the subchannel bandwidth, and the number of sampling subintervals may depend on the number of subchannels in a wideband channel.

FIG. 6B illustrates attenuator signal output in accordance with some embodiments of the present invention. Signal levels received on different subchannels may have different average power levels, which may result in different signal levels at the output of the subchannel low-pass filters. Higher resolution analog-to-digital converters are generally required to digitize such signals. Higher resolution analog-to-digital converters tend to be very expensive. In some embodiments, a per-subchannel automatic gain control may be implemented with an attenuator, such as attenuator 146 (FIG. 1). As illustrated in FIG. 6B, attenuator output signal 624 during subinterval 616 may provide an attenuation level to normalize the input signal to a first subchannel low-pass filter to within the dynamic range of a subsequent analog-to-digital converter. During subinterval 618, the attenuator output signal may be changed based on the signal level from the next subchannel. This process may be performed during a filter-input sampling interval for each subchannel and may provide a more normalized output for analog-to-digital conversion, allowing the use of lower resolution analog-to-digital converter circuitry.

In alternate embodiments, instead of a selectable attenuator in the RF signal path, baseband amplifiers with automatic gain control may be provided before the subchannel low-pass filters. An example of this is illustrated in FIGS. 4A and 4B.

FIG. 6C illustrates baseband signal inputs to subchannel low-pass filters in accordance with embodiments of the present invention. Baseband signal inputs 626, 628, 630 and 632 may correspond respectively to subchannel signals 606, 608, 610 and 612 received respectively during sampling subintervals 616, 618, 620 and 622. As illustrated, baseband signal inputs 626, 628, 630 and 632 may be normalized to within the range of a subsequent analog-to-digital converter. Subchannel signals 606, 608, 610 and 612 are also illustrated as being sampled respectively during sampling subintervals 634, 636, 638 and 640 of next interval 604 at the beginning of the next OFDM symbol. In some embodiments, the sampling for a subchannel may be repeated at least as often as the inverse of a bandwidth of a subchannel, although the scope of the present invention is not limited in this respect. The filter-input sampling interval may be selected to help assure that signal information from the subchannels is not lost during the sampling of the other subchannels. In the examples illustrated in FIGS. 6A, 6B and 6C with 20-MHz subchannels, a sampling interval may occur for each subchannel at least once every 50 ns, although the scope of the invention is not limited in this respect.

Figure 7:
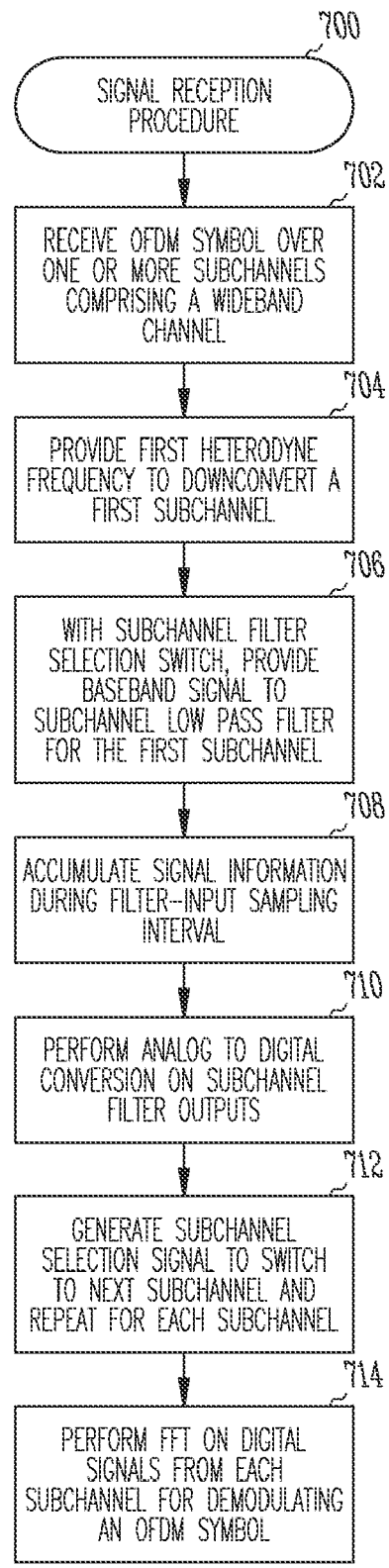
FIG. 7 is a flow chart of a signal reception procedure in accordance with some embodiments of the present invention.

FIG. 7 is a flow chart of a signal reception procedure in accordance with some embodiments of the present invention. Procedure 700 may be performed by a receiver, such as receiver 100 (FIG. 1) to receive an OFDM symbol over one or more subchannels comprising a wideband channel.

In operation 702, RF circuitry of a receiver may simultaneously receive RF signals over one or more subchannels. Operation 702 may be performed by RF circuitry 102 (FIG. 1), although the scope of the invention is not limited in this respect.

In operation 704, a heterodyne frequency may be generated to downconvert the RF signals in the first subchannel to baseband. The proper heterodyne frequency may be generated for the first subchannel in response to a subchannel selection signal which may select the first subchannel. In some embodiments, baseband signals for an I-channel and Q-channel may be generated. Operation 704 may be performed by heterodyne frequency generator 116 (FIG. 1), although the scope of the invention is not limited in this respect.

In operation 706, the baseband signals may be provided to a subchannel low-pass filter associated with the first subchannel. A subchannel filter selection switch may be responsive to the subchannel filter input selection signal to provide the baseband signal to the proper subchannel low-pass filter. Operation 706 may be performed by subchannel filter selection switches 108 and 158 (FIG. 1), although the scope of the invention is not limited in this respect.

In operation 708, the selected subchannel low-pass filter may accumulate signal information from the baseband signal during a portion of a filter-input sampling interval. During the filter-input sampling interval time, the selected subchannel low-pass filter may update its state. Operation 708 may be performed during a portion of the filter-input sampling interval which may be repeated at least as often as the inverse of the subchannel bandwidth. Operation 708 may be performed by one of subchannel low-pass filter 110 (FIG. 1) for the I-channel component, and one of subchannel low-pass filters 160 (FIG. 1) for the Q-channel component, although the scope of the invention is not limited in this respect.

Operation 710 performs an analog-to-digital conversion on the accumulated signal output of the first subchannel low-pass filter. Operation 710 may be performed by analog-to-digital conversion circuitry 126 (FIG. 1) for the I-channel component, and analog-to-digital conversion circuitry 166 (FIG. 1) for the Q-channel component, although the scope of the invention is not limited in this respect. In some embodiments, operation 710 may perform an analog-to-digital conversion on the accumulated signal output of the first subchannel low-pass filter during a filter-output sampling interval.

Operation 712 generates the subchannel filter input selection signal to switch to a next subchannel, and operations 704 through 708 may be repeated for the next subchannel. The subchannel selection signal may be generated by a system controller, such as system controller 122 (FIG. 1), although the scope of the invention is not limited in this respect. Operations 704 through 708 may be performed for each subchannel during the subchannel input sampling interval. Operation 710, on the other hand, may be performed for each subchannel for each filter-output sampling interval. The filter-input sampling interval and the subchannel output sampling interval may be at least as great as the inverse of subchannel bandwidth. In the case of 20-MHz subchannels, these sampling intervals may occur less than about every 50 ns, allowing operations 704 through 710 to be performed for each subchannel, at least once every 50 ns. Although subchannel input sampling interval and the subchannel output sampling interval may be equal, nothing requires this. Subchannel output sampling interval may be based on a multiple of the subchannel bandwidth to allow FFT processing. Subchannel input sampling interval may be selected to, among other things, decrease unwanted impulse disturbances from the RF portion of receiver 100 (FIG. 1) to the ADCs and the DSP.

Once enough samples are received, operation 714 performs an FFT on the digital signals generated from the subchannels (and for both the I and Q channel components) to demodulate an OFDM symbol for subsequent use in generating a decoded bit stream. Operation 714 may be performed by DSP 120 (FIG. 1), although the scope of the invention is not limited in this respect.

In some embodiments, procedure 700 may further comprise selecting an attenuation level in response to the subchannel selection signal to provide a normalized baseband signal level at the inputs of the subchannel low-pass filters. In other embodiments, procedure 700 may further comprise providing a gain control signal to baseband amplifiers to normalize the baseband signal level inputs of the subchannel low-pass filters.

In some other embodiments, procedure 700 may be performed by a receiver to receive an OFDM symbol over a single subchannel comprising a plurality of spatial channels. In these embodiments, each of a plurality of spatially diverse antennas may receive signals from one spatial channel. In some embodiments, each spatial channel may be used to communicate separate or independent data streams on the same subcarriers as the other spatial channels, allowing the reception of additional data without an increase in frequency bandwidth. In other embodiments, each spatial channel may be used to communicate the same data as the other spatial channels.

Although the individual operations of procedure 700 are illustrated and described as separate operations, one or more of the individual operations may be performed concurrently, and nothing requires that the operations be performed in the order illustrated.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A quasi-parallel wideband receiver to receive signals that are transmitted simultaneously on subchannels of a wideband channel that comprises a plurality of subchannels, the quasi-parallel receiver comprising:
    a plurality of subchannel low-pass filters, each associated with one of the subchannels;
    a subchannel filter selection switch having a plurality of outputs, wherein each output is coupled to an input of one of the subchannel low-pass filters, the subchannel filter selection switch is to select a subchannel low-pass filter associated with one of the outputs during a filter-input sampling interval to provide an analog baseband signal to the selected one of the subchannel low-pass filters; and
    a heterodyne frequency generator to provide one of a plurality of heterodyne frequencies to convert a radio-frequency signal received within a selected subchannel to the analog baseband signal,
    wherein the subchannel low-pass filters are to accumulate signal information from an associated one of a plurality of subchannels during the filter-input sampling interval that is to occur at least as often as an inverse of a bandwidth of a subchannel.

2. The quasi-parallel wideband receiver of claim 1 further comprising radio-frequency circuitry to receive orthogonal frequency division multiplexed signals in the wideband channel,
    wherein each subchannel low-pass filter corresponds to one of the plurality of subchannels,
    wherein the subchannels have a subchannel bandwidth, and
    wherein the subchannel low-pass filters have a filter bandwidth of approximately half the subchannel bandwidth.

3. The quasi-parallel wideband receiver of claim 1 further comprising:
    a whole-channel analog-to-digital converter; and
    a subchannel filter output selection switch responsive to a subchannel filter output selection signal to provide an accumulated signal output from the selected subchannel low-pass filter to the whole-channel analog-to-digital converter.

4. The quasi-parallel wideband receiver of claim 1 further comprising a plurality of subchannel analog-to-digital converters, the subchannel analog-to-digital converters to receive an accumulated signal output from a corresponding one of the subchannel low-pass filters.

5. The quasi-parallel wideband receiver of claim 4 further comprising an attenuator in a radio-frequency signal path responsive to the subchannel selection signal to attenuate the radio-frequency signal and provide a normalized signal level for the selected subchannel filter and a corresponding one of the subchannel analog-to-digital converters.

6. The quasi-parallel wideband receiver of claim 1 wherein the heterodyne frequency generator comprises:
    a fixed-frequency voltage-controlled oscillator to generate a reference frequency;
    a digital synthesizer to generate a selected one of a plurality of stepped frequencies in response to a subchannel selection signal; and
    a frequency combiner to combine the reference frequency and the selected one of the stepped frequencies to generate one of the plurality of heterodyne frequencies.

7. The quasi-parallel wideband receiver of claim 1 wherein the heterodyne frequency generator comprises:
    a plurality of fixed-frequency voltage-controlled oscillators, each fixed-frequency voltage-controlled oscillator to generate a corresponding one of the plurality of heterodyne frequencies; and
    a subchannel heterodyne switch to select a heterodyne frequency from one of the fixed-frequency voltage-controlled oscillators in response to a subchannel selection signal.

8. The quasi-parallel wideband receiver of claim 1 further comprising:
    a plurality of subchannel analog-to-digital converters, the subchannel analog-to-digital converters to receive an accumulated signal output from a corresponding one of the subchannel low-pass filters; and
    a plurality of subchannel amplifiers to amplify the accumulated signal outputs based on a gain control signal, the gain control signal being generated for each subchannel.

9. A receiver comprising:
    a subchannel filter selection switch to provide a baseband signal to a selected one of a plurality of subchannel low-pass filters;
    a heterodyne frequency generator to provide one of a plurality of heterodyne frequencies to convert a radio-frequency signal received within a selected subchannel to the baseband signal; and
    a system controller to generate a subchannel selection signal for the subchannel filter selection switch and the heterodyne frequency generator,
    wherein the subchannel low-pass filters are to accumulate signal information from an associated one of a plurality of subchannels during a filter-input sampling interval,
    wherein the selected one of the subchannel low-pass filters corresponds to the selected subchannel of the plurality of subchannels,
    wherein the heterodyne frequency generator is responsive to the subchannel selection signal to generate one of the heterodyne frequencies to convert radio-frequency signals within a corresponding one of the subchannels within the filter-input sampling interval,
    wherein the subchannel filter selection switch is responsive to the subchannel selection signal to switch between the subchannel low-pass filters, and wherein the filter-input sampling interval is to occur at least as often as the inverse of a bandwidth of a subchannel.

10. A receiver comprising:

a plurality of subchannel low-pass filters;

a subchannel filter selection switch to provide an analog baseband signal to a selected one of the subchannel low-pass filters; and a heterodyne frequency generator to provide one of a plurality of heterodyne frequencies to convert a radio-frequency signal received within a selected subchannel to the analog baseband signal, wherein the subchannel low-pass filters are to accumulate signal information from an associated one of a plurality of subchannels during a filter-input sampling interval, wherein the receiver further comprises:

a whole-channel analog-to-digital converter; and a subchannel filter output selection switch responsive to a subchannel filter output selection signal to provide an accumulated signal output from the selected subchannel low-pass filter to the whole-channel analog-to-digital converter, wherein a wideband channel comprises up to four of the subchannels, the subchannels having bandwidths of approximately 20-MHz, wherein the whole-channel analog-to-digital converter comprises at least a 9-bit analog-to-digital converter having a sampling rate of at least as great as a bandwidth of the wideband channel, and wherein the heterodyne frequency generator is to generate heterodyne frequencies during a filter-input sampling interval for each subchannel, the filter-input sampling interval being at least as great as the inverse of the bandwidth of the subchannels, and wherein the subchannel filter output selection switch responsive to the subchannel filter output selection signal provides accumulated signal outputs from each of the subchannel low-pass filters to the whole-channel analog-to-digital converter once for each filter-output sampling interval, the filter-output sampling interval being at least as great as the inverse of the bandwidth of the subchannels.

11. A receiver comprising:

a plurality of subchannel low-pass filters;

a subchannel filter selection switch to provide an analog baseband signal to a selected one of the subchannel low-pass filters;

a heterodyne frequency generator to provide one of a plurality of heterodyne frequencies to convert a radio-frequency signal received within a selected subchannel to the analog baseband signal; and a plurality of subchannel analog-to-digital converters, the subchannel analog-to-digital converters to receive an accumulated signal output from a corresponding one of the subchannel low-pass filters, wherein the subchannel low-pass filters are to accumulate signal information from an associated one of a plurality of subchannels during a filter-input sampling interval, wherein the subchannels have bandwidths of approximately 20-MHz, wherein the subchannel analog-to-digital converters comprise at least 9-bit analog-to-digital converters having sampling rates of at least as great as a bandwidth of the subchannel, and wherein the heterodyne frequency generator is to generate heterodyne frequencies or each subchannel during a filter-input sampling interval, the sampling interval being at least as great as the inverse of the bandwidth of the subchannels.

12. A receiver comprising:

radio-frequency circuitry to receive signals over a single subchannel comprising a plurality of spatial channels;

a subchannel filter selection switch to provide a baseband signal to a selected one of a plurality of subchannel low-pass filters; and a heterodyne frequency generator to provide one of a plurality of heterodyne frequencies to convert a radio-frequency signal received within a selected subchannel to the baseband signal, wherein the subchannel low-pass filters are to accumulate signal information from an associated one of a plurality of subchannels during a filter-input sampling interval, wherein the radio-frequency circuitry is to receive signals over a single subchannel comprising a plurality of spatial channels, wherein the radio-frequency circuitry comprises an antenna selection switch to select one of a plurality of antennas corresponding to one of the spatial channels, wherein each subchannel low-pass filter corresponds to one of the spatial channels, wherein the heterodyne frequency generator is to provide a single heterodyne frequency to convert radio-frequency signals of the single subchannel to baseband signals, and wherein the subchannel low-pass filters are to accumulate signal information for a corresponding one of the spatial channels.

13. The receiver of claim 12 further comprising:

a plurality of spatial channel analog-to-digital converters, the spatial channel analog-to-digital converters to receive an accumulated signal output from a corresponding one of the subchannel low-pass filters; and a digital signal processor to perform fast Fourier transforms on bit streams from the spatial channel analog-to-digital converters and to generate a parallel group of time-domain samples for each of a plurality of symbol-modulated subcarriers that comprise the single subchannel.

14. The receiver of claim 13 wherein the subchannels comprise a plurality of symbol-modulated orthogonal subcarriers, and wherein each orthogonal subcarrier of a corresponding subchannel has a null at substantially a center frequency of other subcarriers of the corresponding subchannel.

15. The receiver of claim 14 wherein prior to reception by the receiver, the subcarriers are to be individually modulated in accordance with an individual subcarrier modulation assignment comprising one of no modulation, binary phase shift keying (BPSK), quadrature phase shift keying (QPSK), 8PSK, 16-quadrature amplitude modulation (16-QAM), 32-QAM, 64-QAM, 128-QAM, and 256-QAM.

16. A method for receiving signals that are transmitted simultaneously on subchannels of a wideband channel that comprises a plurality of subchannels, the method comprising:

selecting with a subchannel filter selection switch one of a plurality of subchannel low-pass filters based on a selected subchannel of the plurality;

providing an analog baseband signal to the selected subchannel low-pass filter during a filter-input sampling interval, the filter-input sampling interval to occur at least as often as an inverse of a bandwidth of a subchannel;

accumulating signal information from the selected subchannel during the filter-input sampling interval in an associated subchannel low-pass filter;
repeating the selecting, the providing, and the accumulating for others of the subchannels during the filter-input sampling interval; and
performing an analog to digital conversion on the accumulated signal information from the plurality of subchannels to generate digital signals; and
performing a fast Fourier transform on the digital signals to generate a received orthogonal frequency division multiplexed symbol.

17. The method of claim 16 further comprising:
providing, during the filter-input sampling interval, one of a plurality of heterodyne frequencies to convert a radio-frequency signal received within the selected subchannel to the baseband signal.

18. The method of claim 17 further comprising:
generating a constant reference frequency;
generating, with a digital synthesizer, a selected one of a plurality of stepped frequencies in response to a subchannel selection signal; and
combining the reference frequency and the selected one of the stepped frequencies to generate one of the plurality of heterodyne frequencies.

19. The method of claim 17 further comprising:
individually amplifying the accumulated signal outputs based on a gain control signal for each subchannel.

20. The method of claim 17 further comprising:
receiving, with a plurality of spatially diverse antennas, an orthogonal frequency division multiplexed symbol over a single subchannel comprising a plurality of spatial channels; and
generating an antenna selection signal to select one of the antennas corresponding to one of the spatial channels,
wherein each subchannel low-pass filter corresponds to one of the spatial channels,
wherein the heterodyne frequency generator provides a single heterodyne frequency to convert radio-frequency signals of the single subchannel to baseband signals, and
wherein the subchannel low-pass filters accumulate signals for a corresponding one of the spatial channels.

21. A method comprising:
accumulating signal information from a selected one of a plurality of subchannels during a filter-input sampling interval in an associated subchannel low-pass filter;
repeating the accumulating for others of the subchannels during the filter-input sampling interval;
performing a fast Fourier transform on digital signals generated from the accumulated signal information from the plurality of subchannels to generate a received orthogonal frequency division multiplexed symbol;
providing a baseband signal to a selected one of a plurality of subchannel low-pass filters during the filter-input sampling interval;
providing, during the filter-input sampling interval, one of a plurality of heterodyne frequencies to convert a radio-frequency signal received within the selected subchannel to the baseband signal;
generating a subchannel selection signal to responsively provide one of the heterodyne frequencies to downconvert radio-frequency signals within a corresponding one of the subchannels within the filter-input sampling interval; and
switching between the subchannel low-pass filters in response to the subchannel selection signal.

22. The method of claim 21 wherein the subchannel selection signal is generated to provide the filter-input sampling interval at least as often as the inverse of a bandwidth of a subchannel.

23. The method of claim 21 further comprising:
receiving an accumulated signal output from a corresponding one of the subchannel low-pass filters; and
performing an analog-to-digital conversion on the accumulated signal output.

24. The method of claim 23 further comprising:
attenuating, in response to the subchannel selection signal, the radio-frequency signals to provide a normalized signal level for the selected subchannel filter and to perform an analog-to-digital conversion on the accumulated signal output.

25. A system comprising:
a substantially omnidirectional antenna;
a subchannel filter selection switch to provide a baseband signal to a selected one of a plurality of subchannel low-pass filters;
a heterodyne frequency generator to provide one of a plurality of heterodyne frequencies to convert a radio-frequency signal received within a selected subchannel to the baseband signal; and
a system controller,
wherein the subchannel low-pass filters are to accumulate signal information from an associated one of a plurality of subchannels during a filter-input sampling interval,
wherein the system controller is to generate a subchannel selection signal for the subchannel selection switch and the heterodyne frequency generator,
wherein the selected one of the subchannel low-pass filters corresponds to the selected subchannel of the plurality of subchannels,
wherein the heterodyne frequency generator is responsive to the subchannel selection signal to generate one of the heterodyne frequencies to convert RF signals within a corresponding one of the subchannels within the filter-input sampling interval,
wherein the subchannel selection switch is responsive to the subchannel selection signal to switch between the subchannel low-pass filters, and
wherein the filter-input sampling interval is to occur at least as often as the inverse of a bandwidth of a subchannel.

26. The system of claim 25 further comprising:
a plurality of subchannel analog-to-digital converters, the subchannel analog-to-digital converters to receive an accumulated signal output from a corresponding one of the subchannel low-pass filters; and
an attenuator in a radio-frequency signal path responsive to the subchannel selection signal to attenuate the radio-frequency signal and provide a normalized signal level for the selected subchannel filter and a corresponding one of the subchannel analog-to-digital converters.

* * * * *